(12) United States Patent
Wilkins et al.

(10) Patent No.: US 7,319,536 B1
(45) Date of Patent: Jan. 15, 2008

(54) TECHNIQUES FOR SYNCHRONIZING ANY OF A PLURALITY OF ASSOCIATED MULTIMEDIA ASSETS IN A DISTRIBUTED SYSTEM

(75) Inventors: David C. Wilkins, Providence, RI (US); Matt Crosby, Vashon, WA (US)

(73) Assignee: Eastman Kodak Company, Rochester, NY (US)

( * ) Notice: Subject to any disclaimer, the term of this patent is extended or adjusted under 35 U.S.C. 154(b) by 1360 days.

(21) Appl. No.: 09/724,775

(22) Filed: Nov. 28, 2000

Related U.S. Application Data

(60) Provisional application No. 60/172,349, filed on Dec. 16, 1999, provisional application No. 60/128,880, filed on Apr. 12, 1999.

(51) Int. Cl.
G06F 3/12 (2006.01)
G06K 1/00 (2006.01)
(52) U.S. Cl. .................................. 358/1.15; 358/1.13
(58) Field of Classification Search .............. 358/1.15, 358/1.9, 2.1, 1.12, 527, 528; 348/207.99, 348/207.1, 207.11, 207.2, 222.1
See application file for complete search history.

(56) References Cited

U.S. PATENT DOCUMENTS

| | | | |
|---|---|---|---|
| 4,414,621 A | 11/1983 | Bown et al. ................ 364/200 |
| 4,430,526 A | 2/1984 | Brown et al. ................ 178/18 |
| 4,907,146 A | 3/1990 | Caporali ..................... 364/132 |
| 5,892,509 A | 4/1999 | Jakobs et al. ............... 345/331 |
| 6,292,619 B1* | 9/2001 | Fujita et al. .................. 386/52 |
| 6,522,418 B2* | 2/2003 | Yokomizo et al. ......... 358/1.15 |
| 6,557,017 B1* | 4/2003 | Venable ..................... 715/502 |
| 6,567,119 B1* | 5/2003 | Parulski et al. .......... 348/207.2 |
| 6,573,927 B2* | 6/2003 | Parulski et al. ............... 348/32 |

FOREIGN PATENT DOCUMENTS

WO    WO 00/36516    6/2000

OTHER PUBLICATIONS

International Search Report from Corresponding PCT Application PCT/US00/33953.

* cited by examiner

Primary Examiner—Douglas Q. Tran
(74) Attorney, Agent, or Firm—Frank Pincelli

(57) ABSTRACT

Automatically synchronizing any of a group of associated multimedia assets is described is described. A particular one of the set of distributed multimedia assets is modified and the others of the set of distributed multimedia assets are then synchronized based upon the modification. An update edit list corresponding to the modification is generated which is then automatically forwarded to the others of the set of distributed multimedia assets. The update edit list is then used to synchronize each of the distributed multimedia assets to the particular multimedia asset so modified.

18 Claims, 10 Drawing Sheets

TECHNIQUES FOR SYNCHRONIZING ANY OF A PLURALITY OF ASSOCIATED MULTIMEDIA ASSETS IN A DISTRIBUTED SYSTEM

CROSS REFERENCE TO RELATED APPLICATIONS

This application claims benefit of priority under 35 USC § 119(e) of U.S. Provisional Application No. 60/172,349 filed Dec. 16, 1999 and entitled "Techniques for Acquiring a Parent Digital Image (Digital Negative From Any of a Plurality of Multiply Modified Child Digital Images" and is also related to U.S. Provisional Application No. 60/128,880 filed Apr. 12, 1999 and entitled "Image Data Markup Language". This application is also related to co-pending U.S. application Ser. No. 09/724,756 filed Nov. 28, 2000 entitled, "Techniques for Recursively Linking a Multiply Modified Multimedia Asset to an Original Digital Negative" incorporated by reference in its entirety.

BACKGROUND OF THE INVENTION

1. Field of Invention

The invention relates generally to digital image processing systems. More particularly, the invention provides techniques that provide for automatically synchronizing any of a number of associated multimedia assets in a distributed system.

2. Description of Relevant Art

When a user performs image operations using recently developed digital image processing programs such as Adobe Photoshop™ or PhotoDeluxe™, image operations are performed directly on the raw pixels of the image. In those cases where the user "saves" any or all of the changes, all edit operations that have been performed and saved are applied to each pixel in the image such that the original image at the pixel level is overwritten. In this case, the original image, also referred to as a "digital negative", is forever lost. If the user wishes, however, to save the digital image, the user must save the changes to another file thereby preserving the original digital negative.

However, since there is no link or other type reference created between the newly modified image file and its associated digital negative, the user must manually link these two files. Such a situation is shown in FIG. 1 where a user 100 has used, for example, a digital camera 102 (either still or video) to take a digital photo which is usually stored in the digital camera 102 as a digital image file 106 in a particular format such as JPEG, GIF, TIFF etc. However since currently available consumer digital cameras have limited photo editing capabilities and storage capabilities, the user may choose to transfer the image file 106 to a computer 108, or other such device or devices, capable of performing the desired image editing operations in a timely manner.

Once the desired image editing operations (such as cropping, color correction, special effects filters, etc.) have been performed at the pixel level on the image file 106 (either stored on the computer 108 or still residing on the digital camera 102), the user saves those pixel level changes in a second image file 110 in those cases where the user wishes to retain the original photo. In those cases where the original photo is retained (as a digital negative) the user must link the image file 110 representing the edited version of the photo to the original unedited version of the photo represented by image file 106.

When only a few original photos each have a very limited number of associated edited versions, this approach, although inefficient and prone to error, may be acceptable. Unfortunately, however, when the number of original photos, and/or the number of variations increase even slightly, this manual linking approach quickly becomes a management nightmare.

Various conventional approaches to solving this problem have been put forth. One of the most successful, although still inadequate is represented by the suite of image editing software known as FlashPix™ developed by a consortium of companies comprising of the Digital Imaging Group (DIG). Even though FlashPix has managed to resolve some of the above described file management problems, this solution is encumbered by many additional problems.

For example, FlashPix is based on a complex, proprietary file format referred to as COM/"Structured Storage" which is very rigid regarding what operations can be non-destructively performed on the given photo. Unfortunately, it is not possible for a particular FlashPix file to reference many external (i.e., distributed) pieces such that FlashPix cannot directly support a distributed imaging architecture since pieces of an image must reside in only one structured storage file, regardless of its complexity. In this way, even if an application is only referencing one piece of a Structured Storage file, the entire file must be available thereby rendering it incapable of providing a highly desirable flexible distributed model.

In addition to the lack of distributedness, the flexibility of FlashPix and similarly structured applications is further compromised since it can only support specific resolutions (i.e., those that are a "power of two") thereby severely restricting the applications for which it can be usefully applied.

On the Web at various on-line photo processing/distribution sites (such as PhotoNet.com, PhotoWorks.com, and others) and on-line photo sharing sites (such as PhotoPoint.com, Zing.com, and others), users are able to download thumbnails and higher-resolution photos. This invention solves several well known problems, that up until now do not have a general solution. First, the physical linking between the thumbnail and higher resolution photo must be managed manually, such as through the HTML or XML page (i.e. <IMG> tag in HTML). Unfortunately, this is not automatic and is prone to error. Further, it becomes much more complicated if more than two resolutions are needed, beyond the thumbnail and higher resolution image. The ability to download even higher resolution images, based on the user's network bandwidth, is highly desirable.

Once the user has downloaded one thumbnail, or higher resolution image, to the local computer or imaging computing device, there is no mechanism in place that allows the user to access other, possibly higher, resolutions of the thumbnail, without first manually accessing the web site (most likely by invoking Microsoft Internet Explorer or similar browsing application). What is desired is a mechanism, associated with or embedded inside the thumbnail that allows a client side application to directly access other resolutions of the image if available, without requiring the user to manually access it via a Web browser.

Even more importantly, there is no mechanism defined that allows a user to record various image processing operations for this image, referenced in the HTML, such that a higher-resolution image can be re-rendered if needed. In general, the thumbnail and higher resolution image must be processed (in an application such as Adobe Photoshop) so the modified image, with all applied operations, can be generated. This results in yet additional links between various image files if the original "digital negative" is to be retained.

An additional problem relates to the fact that if there are a number of associated image copies distributed amongst a group of interconnected devices and any one of the images is changed, then there is no way to automatically update, or synchronize, the others to coincide with the changed image. For example, if a particular digital image is updated to new version of the digital image, then all other related digital images must also be updated to the most current version.

Therefore, what is desired is an efficient method and apparatus that automatically synchronizes any of a group of distributed multimedia assets.

SUMMARY OF THE INVENTION

The invention relates to an improved method, apparatus and system for automatically synchronizing any of a group of distributed multimedia assets.

In one aspect of the invention, a method of automatically synchronizing any of a group of associated multimedia assets is described. A particular one of the set of distributed multimedia assets is modified and the others of the set of distributed multimedia assets are then synchronized based upon the modification. In a preferred embodiment, an update edit list corresponding to the modification is generated which is then automatically forwarded to the others of the set of distributed multimedia assets. The update edit list is then used to synchronize each of the distributed multimedia assets to the particular multimedia asset so modified.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Figure 1:
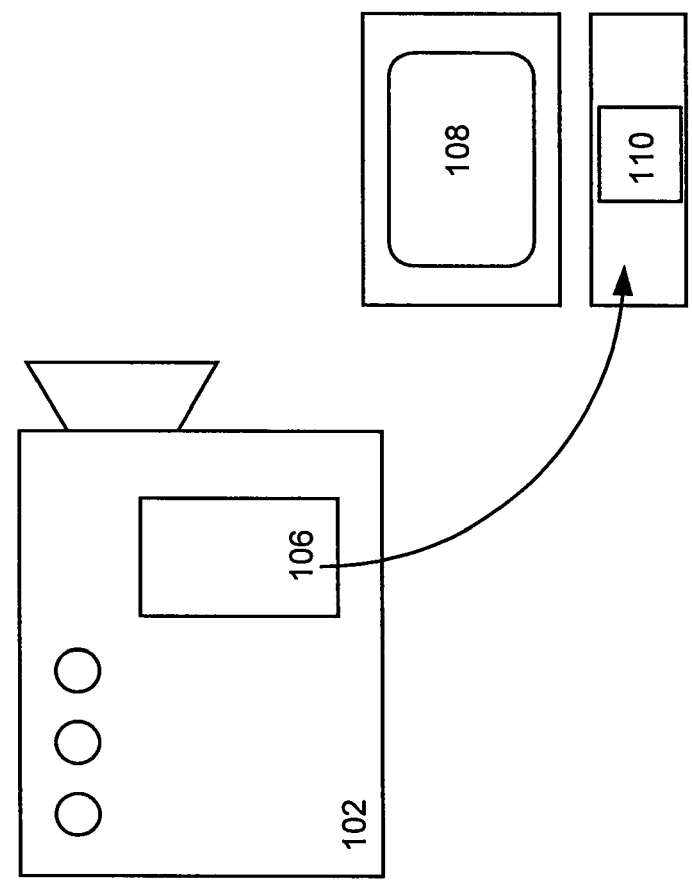
FIG. 1 illustrates a conventional image file management scheme.

Broadly speaking, the invention relates to an improved method, apparatus and system for automatically synchronizing any of a group of distributed multimedia assets. Unlike conventional approaches to image editing, the distributed nature of the invention provides substantially improved flexibility. More specifically, in a distributed system, such as, for example, the Web, CD media, or directly from a digital camera or other imaging appliance device, the invention provides that a user's digital negative can reside anywhere within the distributed system. In addition, the invention provides the additional capability of storing a modified image locally (or remotely) on read-writeable media while maintaining a reference to the original digital negative. In this way, the user is able to not only access the modified image, but can also automatically access the original digital negative. It should be noted and appreciated that the modified image (also known as a resultant proxy image) can take the form of a fully rasterized image or a lower-resolution thumbnail that contains the results of the edits applied to the digital negative.

It should be noted that an additional advantage of the invention is that the resultant proxy image can be very small and dependent upon a specific device. For example, the resultant proxy image derived from a set of edit operations applied by a digital camera having a small LCD display may in fact be a low-resolution thumbnail image. In this way, the resultant proxy image will be properly displayed and optimized for the LCD display on the camera. By using a linked edit list, the editing operations can be applied on the full resolution version of the original high-resolution image (i.e., the digital negative) at a later time whenever a higher-resolution resultant image is needed. Clearly then, two of the benefits from this approach are that the image processing operations are very quick since only those pixels identified by the editing operations at a given resolution are processed resulting in a smaller resultant proxy image thereby preserving in-camera memory storage space.

Based on the editing operation, the software application may requires a much smaller number of pixels from the digital negative if the editing operation can be performed in a resolution-independent manner. However, for cases in which the editing operation is not resolution-independent, the software performing the operation may choose to access more pixels from the digital negative for the editing operation, but resample (reduce the number of pixel in) the output image after the editing operations have been performed, thus resulting in smaller resultant proxy image.

In general, the "edit list" is normally associated with a resultant image, such that the resultant image can be recreated at a desired resolution as needed. This "edit list" contains all the necessary information about how to perform this reconstruction. It will include the reference(s) to the digital negative(s) and any additional multimedia assets needed for this reconstruction. It will also contain an optional list of editing operations that must be performed. The "edit list" can be considered both the "glue" that identifies all digital negatives and other multimedia assets that are needed to reconstruct the resultant image and the "script" on how the digital negatives and other multimedia assets are rendered such that the resultant image can be recreated, at the current resolution of the resultant image or at a different resolution.

It should be realized that an "edit list" can take the form of a variety of different embodiments, three of which are described below. This is meant to describe different variants of an edit list, but not an all-inclusive list. The first embodiment is a list that describes a set of individual operations that are to be performed on a given photo. These edit operations can be applied to a photo to generate the resultant image at the desired output resolution. The advantage of this structure is that new edits can be added to the end of the list or removed from the end of the list through an "undo" operation. A first sample piece of XML code is included for illustrative purposes:

```
<!-- Edit list example that consists of a list of operations applied -->
<!-- This example demonstrates when the edit list is a list of sequential
operations -->
<!-- that is applied to the digital negative. In the example below, an
operation can -->
<!-- be applied more than once, and in any order. This follows the
conventional -->
<!-- model of a list of operations as entered by the user in which the list
can be -->
<!-- at a later time undone if desired (via an undo operation). -->
<PICTURE-IQ-EDIT-LIST>
<DIGITAL-NEGATIVE-LINK type="highest_resolution" height="1600"
width="1200"
    href="www.pictureiq.com/samples/nicholas.jpg" content-
type="image/jpeg" />
<EDIT-SCRIPT type="sequential_list_of_operations">
<!-- auto_fix is an operation that is applied to the digital negative, and
does -->
<!-- not take any parameters -->
<EDIT-COMMAND type="auto_fix"/>
<!-- color_adjustment is applied to the digital negative, with the following
parameters -->
<EDIT-COMMAND type="color_adjustment" red="10" green="–20"
blue="50"/>
<!-- next a warp is applied with the following parameter -->
<EDIT-COMMAND type="warp" amount="20" />
<!-- finally, another color_adjustment command is specified -->
<EDIT-COMMAND type="color_adjustment" red="–10" green="00"
blue="50" />
</EDIT-SCRIPT>
```

An alternative embodiment is to use this list to represent a state description of each operation applied to the photo, in which certain operations can be turned on or off. Each operation can still have an optional parameter list associated with the command, but there is a single "state" for the operation. It is either "on" or "off", and if "on", it can have a parameter associated with it. The advantage of this structure is that the operations and the interaction between the operations are clearly defined by the structure, thus providing consistent results regardless of the order that the user has applied the operations. Either the XML syntax could define the order in which the operations are performed, similar to the first embodiment, or the application can define it, independent of the order in which they appear in the XML file. The key point is that each operation is either "on" or "off" and would normally not appear more than once on the edit list. A second sample piece of XML code is included for illustrative purposes:

```
<!-- Edit list example that consists of a state description of available -->
<!-- operations each operation is either "on" or "off", with its specified -->
<!-- parameter list each operation should only be specified once and the
-->
<!-- order in which it is applied can be strictly specified by the application
-->
<PICTURE-IQ-EDIT-LIST>
<DIGITAL-NEGATIVE-LiNK type="highest_resolution" height="1600"
width="1200"
    href="www.pictureiq.com/samples/nicholas.jpg" content-
type="image/jpeg" />
<EDIT-SCRIPT type="state_description_of_operations">
<!-- warp is specified, with its parameter, but is currently not enabled -->
<!-- (active). If the user enabled warp again, the application could -->
<!-- use either a preset value or the one specified in this file (20), -->
<!-- as required by the application. -->
<EDIT-COMMAND state="off" type="warp" amount="20" />
<!-- color_adjustment and auto_fix are both enabled and applied to the
-->
<!-- digital negative. -->
<EDIT-COMMAND state="on" type="color_adjustment" red="10"
green="–20" blue="50" />
<EDIT-COMMAND state="on" type="auto_fix"/>
</EDIT-SCRIPT>
</PICTURE-IQ-EDIT-LIST>
```

A third embodiment combines the benefits of the first two embodiments. The edit list not only represents the state description of operations, but also includes the ability for one or more of the operations that are part of the state description to be a list of individual operations that are to be applied to the photo, thus merging the two methods It should be noted, this architecture also allows an application to describe access to multiple resolutions of a digital negative from a single file. For example, multiple resolutions of the same image (at different resolution) could be externally linked via the "edit list" that describes the cross-reference between the various distributed image files. In this case, the "edit list" is the "glue" that holds the structure indicative of how each file is interrelated, but not necessarily the "script" that describes additional editing operations, here the "script" portion of the edit list is empty or null. For example, in one implementation, the edit list includes a pointer that points to a remote image file having a higher (or lower) resolution than the digital negative or, in some cases, a resultant proxy image.

The capability for linking an edit list(s) from a low-resolution proxy resultant image provides substantial advantages for e-commerce applications. For example, photo content providers can distribute lower-resolution images for free via the Web or a CD that contain references back to the original high-resolution digital negative (s) that can reside either on a Web site, CD media, or other removable media. Photo Web sharing sites can also use this invention to enable users to link photos, or photo greeting cards (and other compositions such as multi-page albums) to the high-resolution image data and an optional "script" within the edit list for rendering of the photo (or card or album) at a higher-resolution.

An added security feature could also be provided that allows the high-resolution image to be locked with, for example, an encryption key to prevent unauthorized access unless the customer has actually purchased the rights to the given photo. It is a benefit of this invention that the "key" for how the high-resolution digital photo can be accessed is specified by the edit list (either embedded or linked) of the low-resolution proxy image. In addition, it has a further advantage that this meta-data could also include ordering information such as price, restrictions and the like.

The proxy image may also be obscured or "stamped" to render it unsuitable for printing or distribution, while still retaining the capability to access the original image if the user purchases such rights. The proxy image could also contain either a visible or invisible watermark, thus providing an additional form of identification and protection to the image.

It should be noted that both the digital negative and the resultant proxy image can be any industry-standard image formats (i.e. JPEG, PNG, GIF, etc) or even a proprietary file format (although not in the preferred embodiment) since the edit list and links between the images can be encoded in private meta-data embedded inside or externally linked to the image files. In this way, any application regardless whether or not it is cognizant of the invention is able to open and view any image that contain the private meta-data, since the resultant image contains a rasterized version of the image, albeit possibly a lower rendered resolution. Of course, however, applications that do recognize and support the invention will have the ability to re-render the image, as necessary, to achieve any desired result.

It should be noted that an "edit list" of a multimedia asset, such as a digital image, can take many forms, such as for example, a single file representative of one digital negative and one separate XML file associated with the edit list for a given resultant image. In other cases, the edit list can be part of a file, referred to as a catalog file, that includes several different "edit lists" each being associated with a different multimedia asset. In one implementation, a catalog file can include several digital negatives (and their corresponding resultant images) and a single XML file that contains several different XML edit lists, one for each resultant image. In this way, the catalog file is an efficient approach for maintaining edit lists for a number of images in a single file.

Figure 2A:
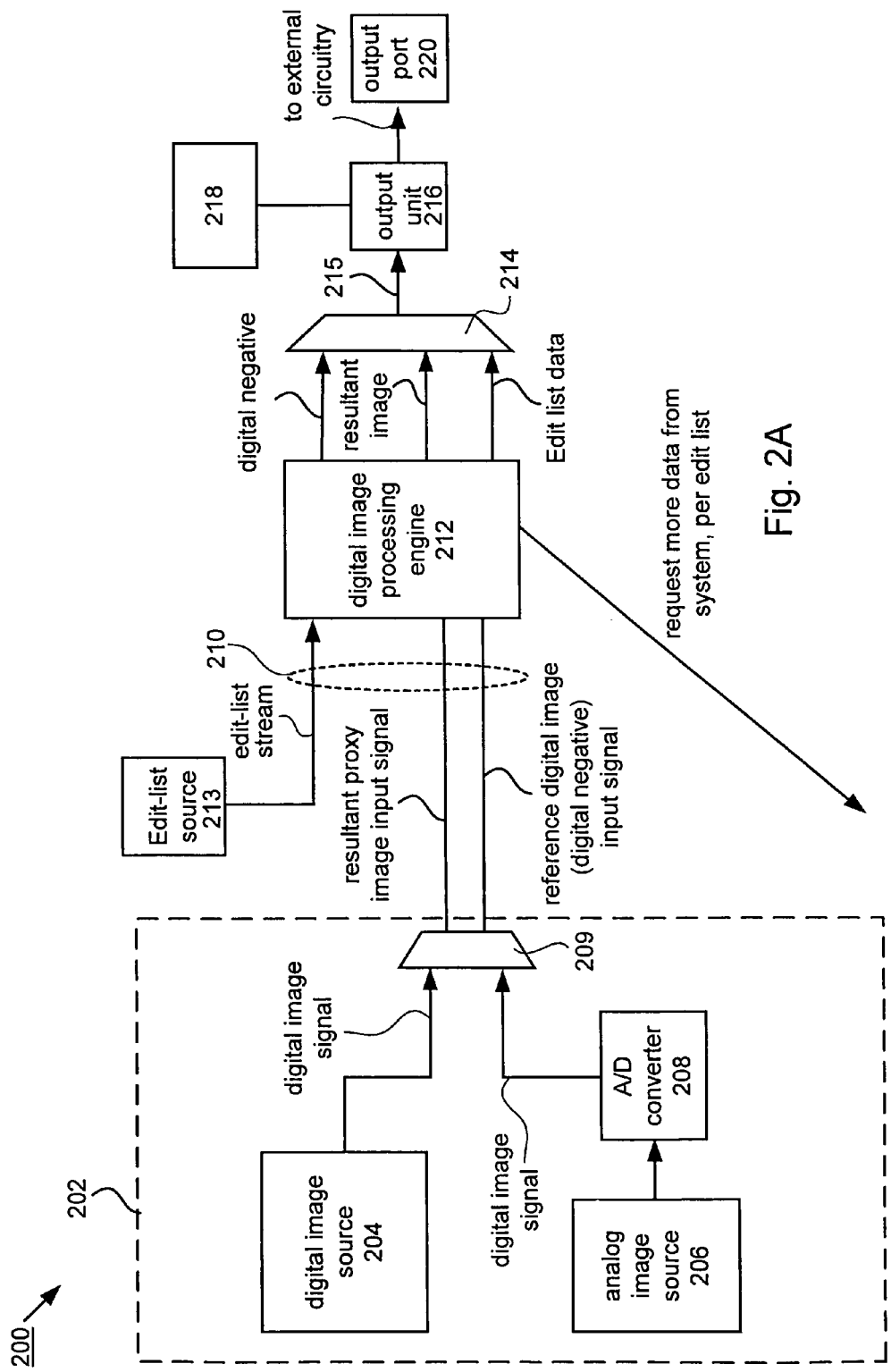
FIG. 2A shows a block diagram of a digital image processor system in accordance with an embodiment of the invention is shown.

Referring now to FIG. 2A, a block diagram of a digital image processor system 200 in accordance with an embodiment of the invention is shown. Digital image processor system 200 includes an image source 202 arranged to provide any number of digital or analog image input signals for processing. The image source 202 can provide a digital image stream that can take the form of a still image (having a format such as JPEG or TIFF) as well as video from, for example, a digital television (DTV), a DVD, a CD, set top box (with satellite DSS or cable signal), the Internet (also commonly referred to as the WEB), and the like. In this way, a digital image source 204 can provide any number and type of well-known formats, such as, JPEG, BMP, TIFF, BNC composite, serial digital, parallel digital, RGB, or consumer digital video. When the digital image source 204 is a digital television, the input signal is a digital video signal having any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video. Alternatively, as an analog image source 206, the analog signal provided includes analog signals derived from, for example, an analog television, still camera, analog VCR, DVD player, camcorder, laser disk player, TV tuner, scanner, set top box (with satellite DSS or cable signal), game machines, imaging kiosks, as well as the WEB, and the like.

In order to convert the analog signal provided by the analog image source 206 to an appropriate digital signal, an analog-to-digital converter (A/D) 208 coupled to the analog image source 206 converts an analog voltage or current signal into a discrete series of digitally encoded numbers (signal). In this way, a digital image data word suitable for digital processing is thereby generated. Any of a wide variety of A/D converters can be used, such as for example those manufactured by: Philips, Texas Instrument, Analog Devices, Brooktree, and others.

In the described embodiment, a selector unit 209 selects the digital image stream from either the digital image source 204 or the A/D converter 208 to form an input digital image stream 210 to a digital image processing engine 212. Such an engine can be implemented as described in more detail with reference to FIGS. 3-6. In some cases, the input stream 210 has embedded therein a digital image in the form of a digital negative also referred to as a reference image. In other cases, however, the digital image embedded in the input stream 210 can take the form of a resultant proxy image 300 (i.e., modified image file) having either an embedded edit list file 302 as illustrated in FIG. 2C or having a pointer that identifies an external edit list file 304 as shown in FIG. 2D. In either case, the edit list files 302 and 304 provide a pixel by pixel image processing instruction set operable on corresponding pixels in the associated digital negative.

In the described embodiment, an external edit list source 213 provides external edit list data to the digital image processing engine 212. The external edit list source 213 can represent any number and type of devices suitably arranged to provide appropriately configured edit list data used to modify an associated digital image. Such devices include, but are not limited to, user interface (UI) controllers (at the control of an application or other device), a resultant proxy image generator (such as a digital still camera having embedded image processing capabilities), commands to a server computing device from a client computing device, printers and other like peripheral devices that generate system commands (for example, re-rasterizing a particular digital image to suit a particular printing need), and other devices well known to those skilled in the art. In the preferred embodiment, an open standard such as XML is desired. However, any other format, open or proprietary, can be used to represent the "edit list".

The image processing engine 212 operates on the digital image embedded in the incoming digital image stream 210 based, in part, upon the accompanying edit list data, if any. For example, in the case where the digital image embedded in the input stream 210 is a digital negative type image (i.e., a reference image), then the incoming digital negative generally has no associated edit list data (since it is by definition an image to be used as a reference). This is typically the case when the image processing engine 212 detects that the incoming digital image has no associated edit list data. In this case, the image processing engine 212 treats that incoming digital image as a reference digital image and passes it through to an output unit 216 without further processing.

When the image processing engine 212 detects that the incoming image is a resultant proxy image (i.e., one that has been modified), the image processing engine 212 then determines the method of association (i.e., whether the corresponding edit list data is embedded in the incoming image file as an edit list (as illustrated in FIG. 3A), if the image file points to the appropriate edit list file (as illustrated in FIG. 3B), or has been generated by an external source (such as a UI control, printer, or other imaging device)) and not actually associated with the resultant image in any way.

The edit list data associated with the resultant image is identified and known to be of the specific format known by the image processing engine 212. Of course, it is possible for a digital negative or the resultant image to include other data as required by an application that could be ignored by the image processing engine 212 if it is deemed irrelevant. This may be the case when file formats are developed that embed other types of data in the edit list in its preferred embodiment as an XML file format.

It is particularly advantageous that an edit list (commands for the specific imaging operations) of operations that are applied to a given photo are included in a particular edit list file can be stored with the resultant image. This arrangement allows for those operations identified by the edit list to be reapplied to the digital negative, if desired. It also provides a way for the user to "undo" certain operations or "disabled" or otherwise turn off certain operations that have been applied to the photo. In so doing, this mechanism allows these operations to be reapplied at any resolution such that higher quality results can be achieved.

In some cases, however, the image-processing engine 212 detects external edit list data only that is supplied by, for example, a printer. In such cases, the image processing engine 212 is capable of using the external edit list data file to process any selected image file based upon the external edit list data. For example, if a particular printing job requires a printed image to be enlarged from the original, then the associated edit list can have re-rasterizing instructions which have the effect of scaling the original image to whatever size is deemed to be appropriate. In the described embodiment, the image processing engine 212 processes the received digital image according to the instructions (if any) included in any edit list associated with (embedded in or pointed to by) the incoming image file. When the image processing engine 212 modifies an incoming digital image based upon acquired edit list data, the modified image can be either a modified resultant proxy image with an embedded edit list or it can be a modified resulting proxy image that points to an edit list file having the appropriate edit list data in the form of an edit list, for example.

In the case of a printer generated edit list and the incoming image file is a digital negative, then the image processing engine performs the image processing operations from the edit list (such as enlarging the image) on the incoming digital negative and then passes it to an output selector 214. In the cases where the incoming resultant image file has its own edit list either embedded in or pointed to, then the image processing engine 212 performs the image processing operations accordingly on only those pixels in the incoming digital image so identified by the corresponding edit list data in the edit list associated with the resultant image as well as those editing commands generated by the printer (such as enlarging the original). In both of these cases, a physical "resultant image" might not saved, but passed through to the printer port 220 for output.

The use of the externally generated edit list could also serve other purposes. For example, an application or device (such as a printer) could allow the user to toggle viewing/output display states. For instance, suppose every displayed output image should have an imaging operation applied (such as color adjustment needed for a de-saturation step before display on an NTSC television). These commands could be use as input to the edit list source 213 and automatically applied to all photos processed. In some situations, where the images are not saved, but printed (or just displayed), a physical resultant image might not be persisted (beyond an intermediate image/file that is sent to the printer or display).

In a similar way, the edit list source 213 could be driven by an application or device to allow for batch operations. For example, when images are first uploaded to a Web site, each photo could be automatically processed (made better via AutoFix imaging operation) when they are uploaded. However, in this case, the original digital negative could be preserved, but with a modified resultant image that contains an edit list of operations (such as AutoFix) with the link back to the original digital negative.

In any case, all output image streams are output to the output selector 214 and based upon user supplied selection criteria, one of the output image streams is selected to form an output image stream 215. In the described embodiment, the output image stream 215 forms an input to an output unit 216 that is coupled to external circuitry that can include an image display unit 218 capable of displaying the image provided by the output unit 216. In still other cases, the output unit 216 can be coupled to an output port 220 capable of being coupled to other external circuitry (not shown) such as a computer that, in turn, provides an appropriate display apparatus. In the described embodiment, the output port 220 includes I/O ports such as a parallel port, a serial port, a system bus, a USB port, 1394, SCSI, a TV signal output port, a PCMCIA port, network port (to connect to the Internet), as well as a modem port. As such, the output port 220 can also be arranged to transmit the image provided by the output unit 216 (in a format such as raw RGB, JPEG, TIFF, PostScript, a proprietary image format, etc.) to an interconnected network of computers (such as the Internet). In this way, any of the interconnected computers can be used to, for example, view the image embedded in the image stream 215 thereby allowing any number of end-users to view the embedded image.

Figure 2B:
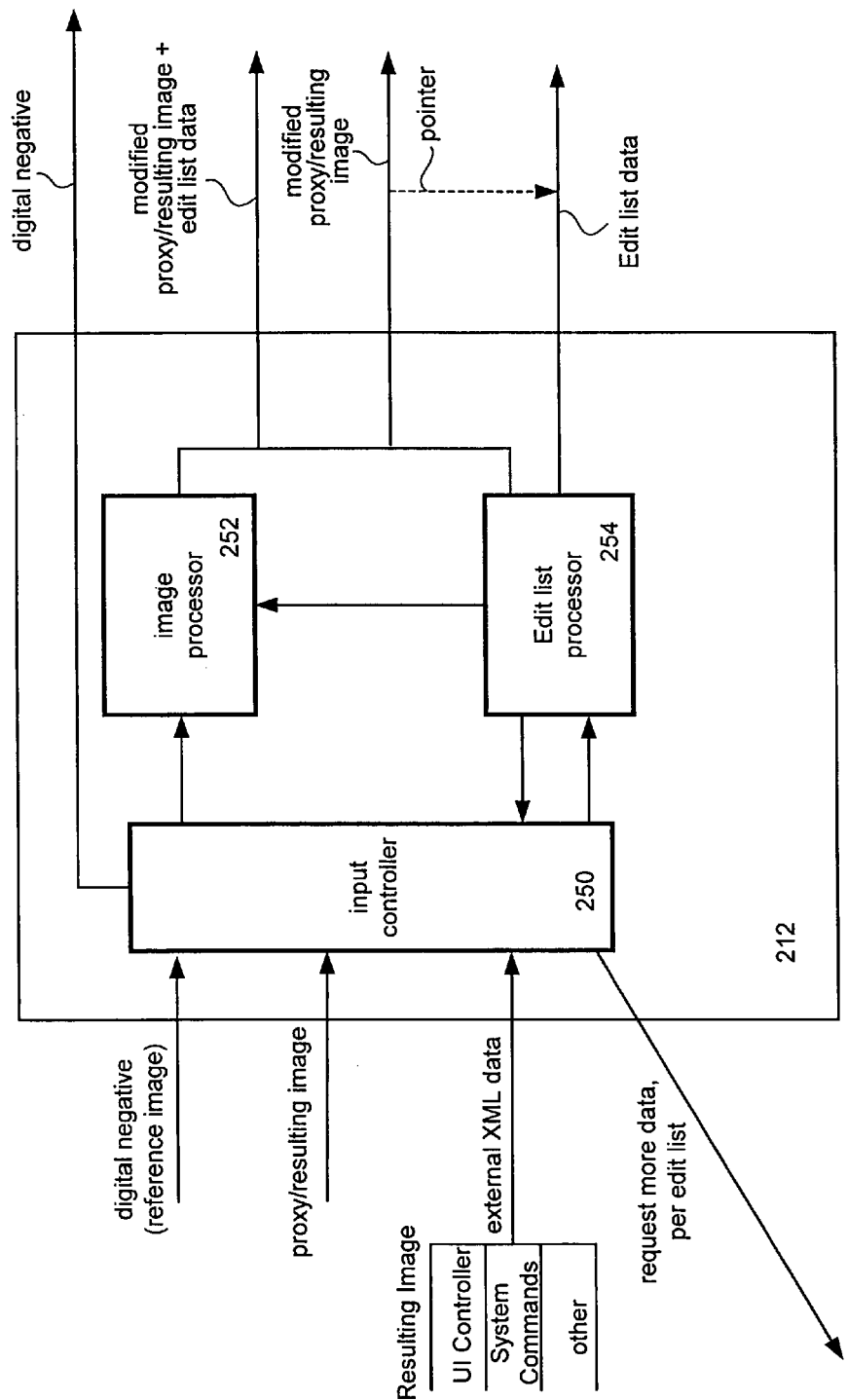
FIG. 2B illustrates a particular implementation of the image processing engine shown in FIG. 2A.
Figure 2D:
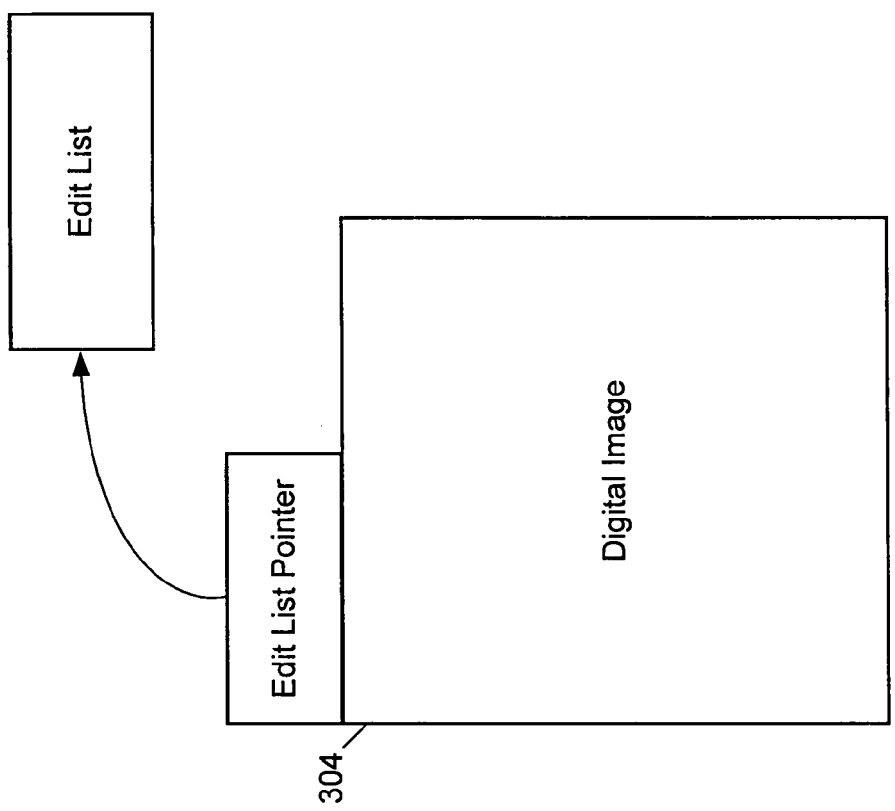
FIGS. 2C and 2D are examples of resultant proxy image files and associated edit list files in accordance with an embodiment of the invention.
Figure 2C:
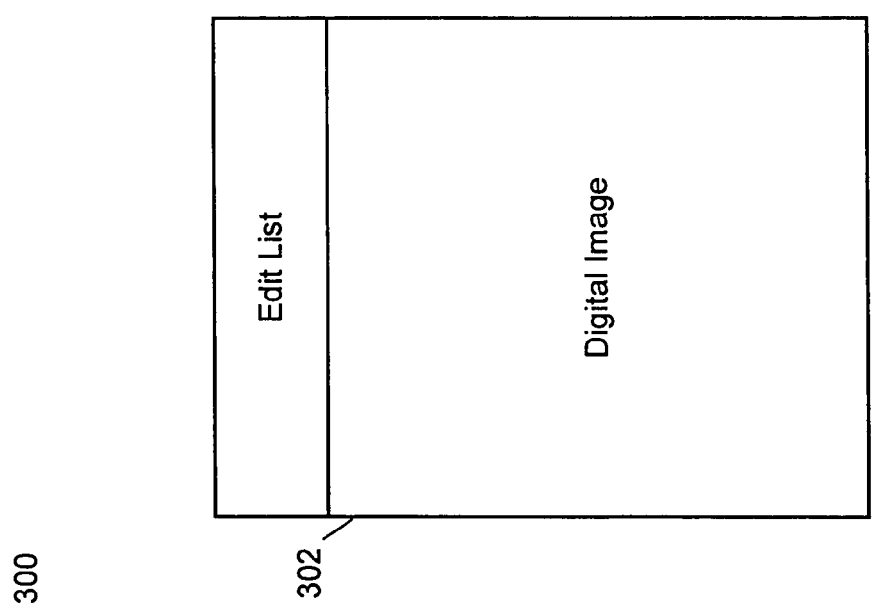

FIG. 2B illustrates a particular implementation of the image processing engine 212 in accordance with an embodiment of the invention. As implemented, the image processing engine 212 includes an input controller 250 coupled to an image processor 252 and an edit list processor 254. In operation, the input controller 250 determines whether or not a received input signal is a resultant proxy image, a reference image, or an external edit list data file. In the case when the input signal is a reference image (digital negative) and no external edit list data is supplied, the input controller 250 outputs the reference directly to the output unit 216 without further image processing.

In the case when the input signal is a reference image (digital negative) and there is external edit list data is supplied (such as from a printer), the input controller 250 passes the appropriate edit list data to the edit list processor 254. When edit list data is supplied, the edit list processor 254 will ask the input controller to request the necessary files (other referenced edit lists). Once the input controller obtains the necessary files, they will be passed to the image processor 252. The image processor 252 then uses the image processing operations provided by the edit list processor as defined by the embedded edit list data to modify the original digital negative image to form a resulting proxy image with embedded edit list data in one case or in another case a resulting proxy image that points to an external edit list data file provided by the edit list processor 254.

On the other hand, if the input signal is a resultant proxy image with embedded edit list data, then the input controller 250 passes the appropriate edit list data to the edit list processor 254. When edit list data is supplied, the edit list processor 254 will determine from the edit list data how to access the original digital negative and ask the input controller to request the necessary files. Once the input controller obtains the necessary image files, they will be passed to the image processor 252. The image processor 252 then uses the image processing operations provided by the edit list processor as defined by the embedded edit list data to modify the original digital negative image to form a resulting proxy image with embedded edit list data in one case or in another case a resulting proxy image that points to an external edit list data file provided by the edit list processor 254.

When the edit list processor 254 must process several different edits list (such as one referenced by the resultant image (or possibly multiple ones recursively referenced) or from an external device (such as a printer), the edit list processor will have to generate an accumulated edit list that represents sum of all edit operations. In the preferred embodiment, XML is used, however, other format are equally valid. If there are conflicts between the various edit lists, the application will need to reconcile these differences and process the edit list as is required.

In those cases where the resulting proxy image points to an edit list file or where the edit list data is in the form of an external edit list file, the image processing engine 212 uses the pointer to generate a reference (such as a URL) to locate and download the appropriate edit list file(s). The retrieved edit list data is then used by the edit list processor 252 to generate the resulting proxy image accordingly.

It should be noted that if the input controller 250 cannot access the original digital negative(s), other multi-media assets, or retrieve other parts as described in the edit list, the image processor 252 can, at the direction of the controlling application, directly output the original inputted proxy image. In this way, the user will still see a version of the output image, even though it has not been re-processed.

It should also be noted that if the image processor 252 cannot process the commands specified by the edit list processor 254 for what ever reason, the image processor 252 can, at the direction of the controlling application, directly output the original inputted proxy image. In this way, the user will still see a version of the output image, even though it has not been re-processed.

It should also be noted that the edit list data associated with a reference proxy image can point to multiple digital negatives and other multimedia content used in the creation of the reference proxy image. This can include vector images (such as PostScript, EPS, or PDF), raster images (such as JPEG, TIFF, or PNG), text strings, video, sound, and the like.

Figure 3:
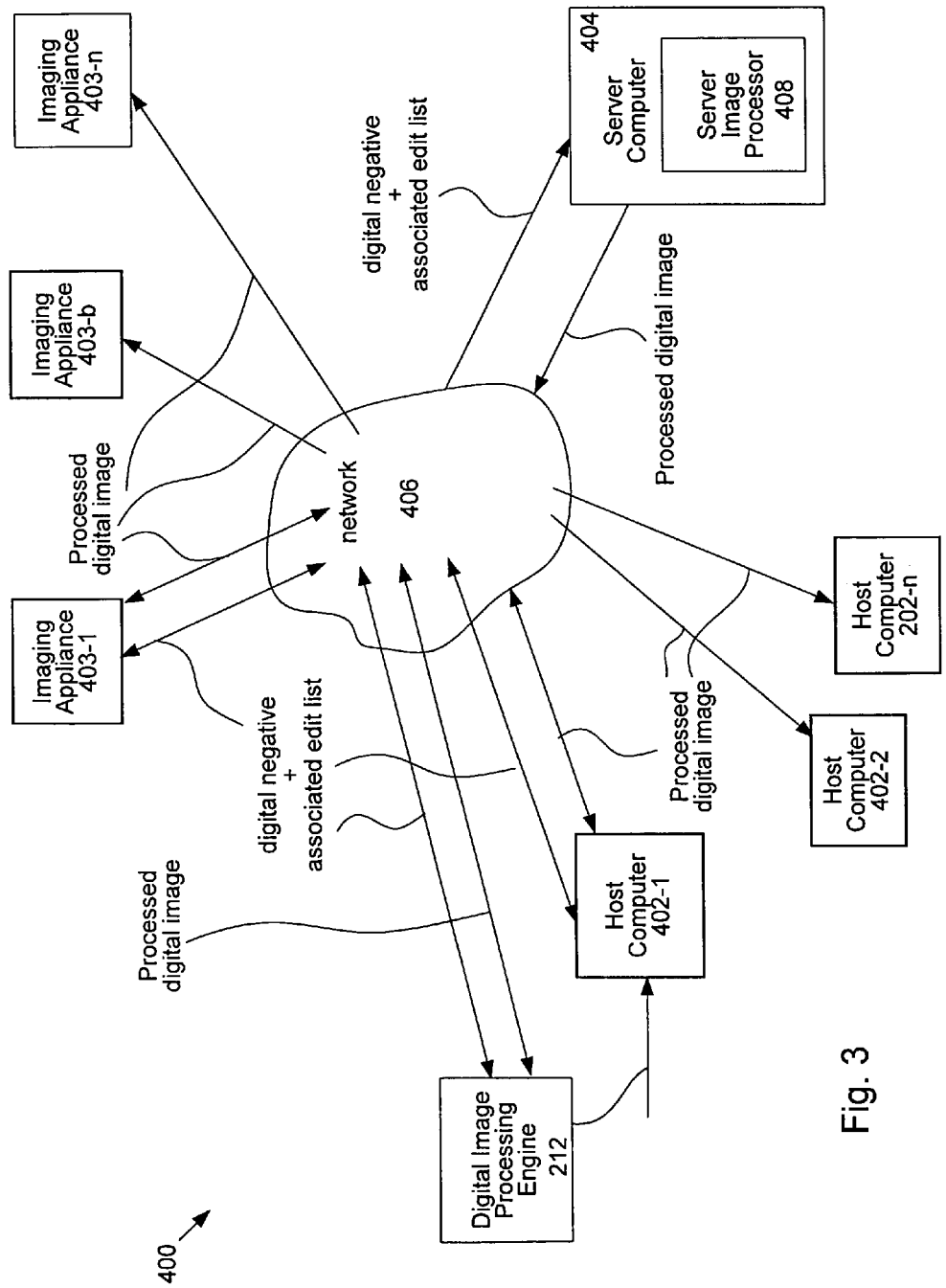
FIG. 3 shows a distributed system in accordance with an embodiment of the invention.

Referring now to FIG. 3 showing a distributed system 400 in accordance with an embodiment of the invention. In the distributed system 400, the image processing engine 212 is coupled to a host computer 402-1 by way of the output port 220. The host computer 402-1 can be, in turn, coupled to a server computer 404 by way of a network 406 or other host computers 402-2 through **402-*n* or an imaging appliance 403-1 through 403-*n*. It is also possible that an imaging appliance 403-1 (such as a digital still or digital video camera, set-top box, game machine, or photo appliance), which has embedded inside of it an image processing engine 212, can be coupled to a server computer 404 by way of a network 406 or other host computers 402-1 through 402-*n* or other imaging appliances 403-2 through 403-*n***.

Further, it is also possible that the image-processing engine 212 can be directly connected to the network 406, independent of computer 402-1 through **402-*n***.

The network 406 can take the form of a distributed network of interconnected computers, such as can be found in the Internet, or it can be a small scale intranet type system found in, for example, small companies and the like. In the described embodiment, the server computer 404 can include a server image processor unit 408 arranged to perform high speed image processing operations based upon edit list data, for example, found in an edit list associated with a particular image file. The server image processor unit 408 is arranged to perform those image processing operations that are either too time consuming or resource intensive to be efficiently performed on the host computer 402-1 or the imaging appliance 403-1.

One such case is when a high resolution rendered image with all operations applied (with maximum quality imaging algorithms) is stored in the standard resultant image file (i.e. JPEG). Associated with this JPEG file (either embedded or linked externally) is the edit list (commands for the specific imaging operations) and reference to the original digital negative. Using this arrangement, a conventionally configured application can ignore the edit list and digital negative reference and simply display the resultant image. It is one of the advantages of this invention that allows an application or other device that does not implement this described system to still have the ability to display the proxy resultant image (at whatever resolution it was saved). However, the application or other device that does not implement this described system can not take advantage of all the other advantages of this invention.

In the described embodiment, the digital image processing engine 212 can be included in any of a number of digital appliances 403-1 such as for example, a digital still or digital video camera, set-top box, game machine, photo appliance, and the like. Using the example of a digital still camera, instead of storing the high-resolution resultant image, an application may decide to store only the low-resolution resultant image. For the case of a digital camera based application, this may be more desirable given the memory and processor constraints of the embedded system. For this case, the user can still choose the image operations as specified in the edit list, but only a low-resolution resultant image is generated and stored locally, in addition to the original digital negative In some cases, such as when the digital image processing engine 212 is part of a set-top box with limited or no local storage space, all components, both digital negative and the low-resolution resultant image with its edit list could be stored remotely on the network.

This has several benefits. First, the amount of processing power (and internal memory requirements) of either the local computing device or the remote computing device (where ever the image processing occurs) is reduced since much fewer pixels are processed. Second, the size of the resultant image file is much smaller since only a low-resolution (or thumbnail) version of the image is persisted. Most importantly, the original digital negative is preserved, along with the smaller resultant image. This is critical since digital camera storage is very constrained. In this case, the original digital negative will be saved and a lower-resolution (and much smaller) resultant image with its associated edit list will be saved to the digital still camera.

Once the image has been processed, the low-resolution resultant image can be sent over the network 406 to any number of other host computers 402-1 through **402-*n* or imaging appliances 403-1 though 403-*n*** for viewing on their respective displays. This has the advantage of only consuming a limited amount of bandwidth for the transfer of the lower-resolution thumbnail image through a low-bandwidth connection. However, at the request of the application, the original digital negative could be accessed such that the edit operations could be reapplied to generate a higher-resolution resultant proxy image.

Depending on the capabilities of the host computer or the imaging appliance, this processing could either occur on the host computer 402-1 or imaging appliance 403-1, or on one of the system attached to the host computer via the network 406, such as another the server image processor unit 408 that is part of the server 404.

It should be noted that for either case described above, the file that contains the edit-list could take on several forms. It may be desirable to generate a JPEG file that contains the resultant image and embeds the edit-list and the reference to the digital negative. This has the benefit that the user has one encapsulated file to maintain. Another approach involves creation of an edit list file that contains the edit-list, the reference to the digital negative, and a reference to the resultant image (possibly a JPEG file that may or may not include metadata about the edit-list and/or reference to digital negative). A third approach would involve the complete encapsulation of not only the resultant image and the edit list, but also a digital negative. This could take the form of an image file (JPEG, TIFF, etc.) or a general "collection" file (such as a compressed ZIP or JAR (Java Archive)). This may be desirable as a distribution mechanism, but maintains the properties described by this invention. It should also be noted that with any of these variants, multiple resolutions may also be stored (embedded or linked) at the application's discretion.

With conventional Web editing techniques, if a user is editing a photo that resides on the Web, the entire image must be downloaded and processed locally. However, this invention allows for a more efficient alternative approach that calls for a low resolution-image to be downloaded from the remote computing device (such as the server computer 406) and processed by the local computer device (such as the host computer 402-1 or photo appliance 403-1). The higher resolution image data would only be required by local computing device and downloaded from the remote computing device if needed. For example, referring to FIG. 4, a user working on a local computing device (such as a photo appliance 403-1 without access to local storage) can efficiently save changes to the server computer 404 over the network 406 even when the network 406 is a low bandwidth network such as a modem. This results in much less bandwidth, assuming only a low-resolution resultant image is transmitted with the edit list and other metadata to the remote computing device (such as the server computer 406). Alternatively, the user may choose to save the resultant image locally with the edit list, in for example, the host computer 402-1 with a link to the original digital negative that can be reference at any node in the network 406.

Another advantage of the distributed nature of this invention is that the actual image operations can be processed either locally in any of the local computing devices (such as the host computer 402-1 or photo appliance 403-1) or a remote computing device (such as the server computer 404), as required by the application. It also is possible to accommodate a mixed mode model in which the low-resolution image is processed locally (performing the commands in the edit list), but a high-resolution image is processed using the same edit list remotely on the server computer 404.

Another advantage of the invention is that it affords the user the ability to synchronize all associated multimedia assets, such as digital photos, and/or albums that contain digital negatives whether cached locally or remotely. By synchronization it is meant that if a particular multimedia asset is modified (thereby creating an update edit list corresponding to and reflective of the most recent modifications), then all associated multimedia assets are automatically updated, or synchronized, to reflect only those most recent modifications. In this way all associated multimedia assets remain coherent (i.e., the variously distributed multimedia assets are all of the same version) with a minimal use of system resources.

Consider the situation where a user has a set of associated digital photos in the form of a photo album, for example, that reside on a local device such as a personal computer, digital camera, or other such consumer electronics device. At some point in time, the user uploads or otherwise transfers the photos to a linked remote device (or devices), such as, for example, a host computer, a Web server, or another non-local computing device. Subsequent to the initial upload event, the user modifies one, or more, of the photos creating in the process an update edit list for each the modified photo(s). At this point all remotely stored versions of the modified photo(s) must be synchronized in order to maintain coherency between the variously distributed photos (i.e., they must all reflect the modifications made to the locally stored photo). This synchronization can be accomplished efficiently and automatically by, in one embodiment, transparently transferring the update edit list to all those linked remote devices onto which all the associated photo(s) reside. In other embodiment, the variously distributed photos can be synchronized by transferring the modified photos themselves (i.e., the resultant images with the edits applied) when network usage vs. processor time on the computer receiving the updated edit list is a consideration. It should be noted, however, that the reverse process is equally applicable in that if so desired, when a remotely cached digital image, for example, is modified, its update edit list is appropriately disseminated throughout the network onto which the digital image has been distributed.

Figure 4:
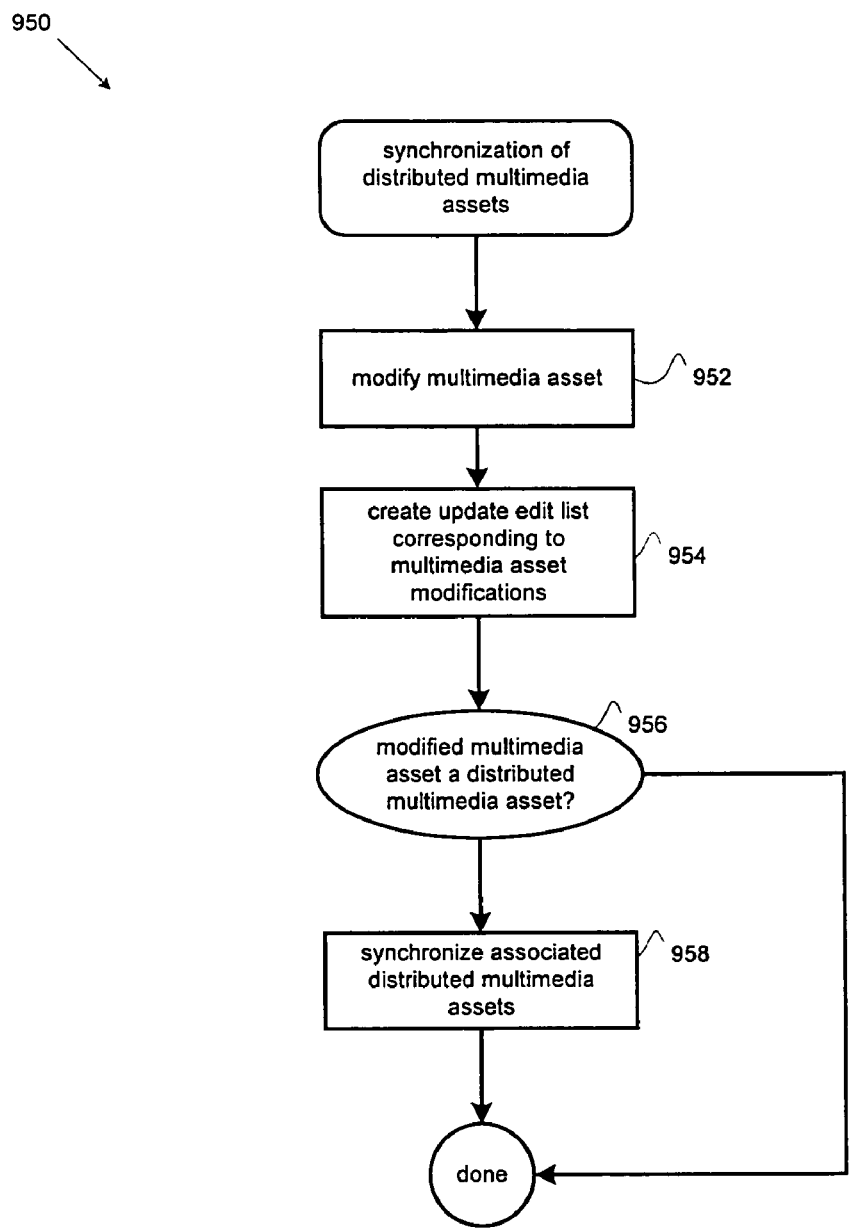
FIG. 4 shows a flowchart detailing a process for synchronizing distributed multimedia assets in accordance with an embodiment of the invention.

With this in mind, FIG. 4 shows a flowchart detailing a process 450 for synchronizing a distributed multimedia asset in accordance with an embodiment of the invention. The process 450 begins at 452 by modifying a multimedia asset. By modifying it is meant any changes, or modifications, to the particular multimedia asset. Such changes include but are not limited to any image editing operations (crop, cut, rotate, etc), changes in image resolution, format, etc. Once the multimedia asset has been modified, an update edit list reflecting only those modifications is generated at 454. By creating only such an update edit list, valuable system and/or network resources are potentially conserved which can be an important consideration in low bandwidth applications. Once the update edit list has been generated, a determination is made whether or not the modified multimedia asset is a distributed multimedia asset at 456. By a distributed multimedia asset it is meant that the multimedia asset has been distributed amongst at least one other device, be it a local or non-local (i.e., remote) device. If it is determined that the modified multimedia asset is not distributed, then the synchronization process 400 is not needed and processing stops, otherwise, the distributed multimedia assets are automatically synchronized at 458. By synchronized, it is meant that all distributed multimedia assets are modified according to the modifications performed at 402. In some embodiments, the synchronization 458 can be performed by sending only the update edit list, in other embodiments, the synchronization 458 can be performed by sending the resultant image (i.e. the digital negative and the associated full edit list) that incorporates all the modifications made to the original multimedia asset.

Figure 5:
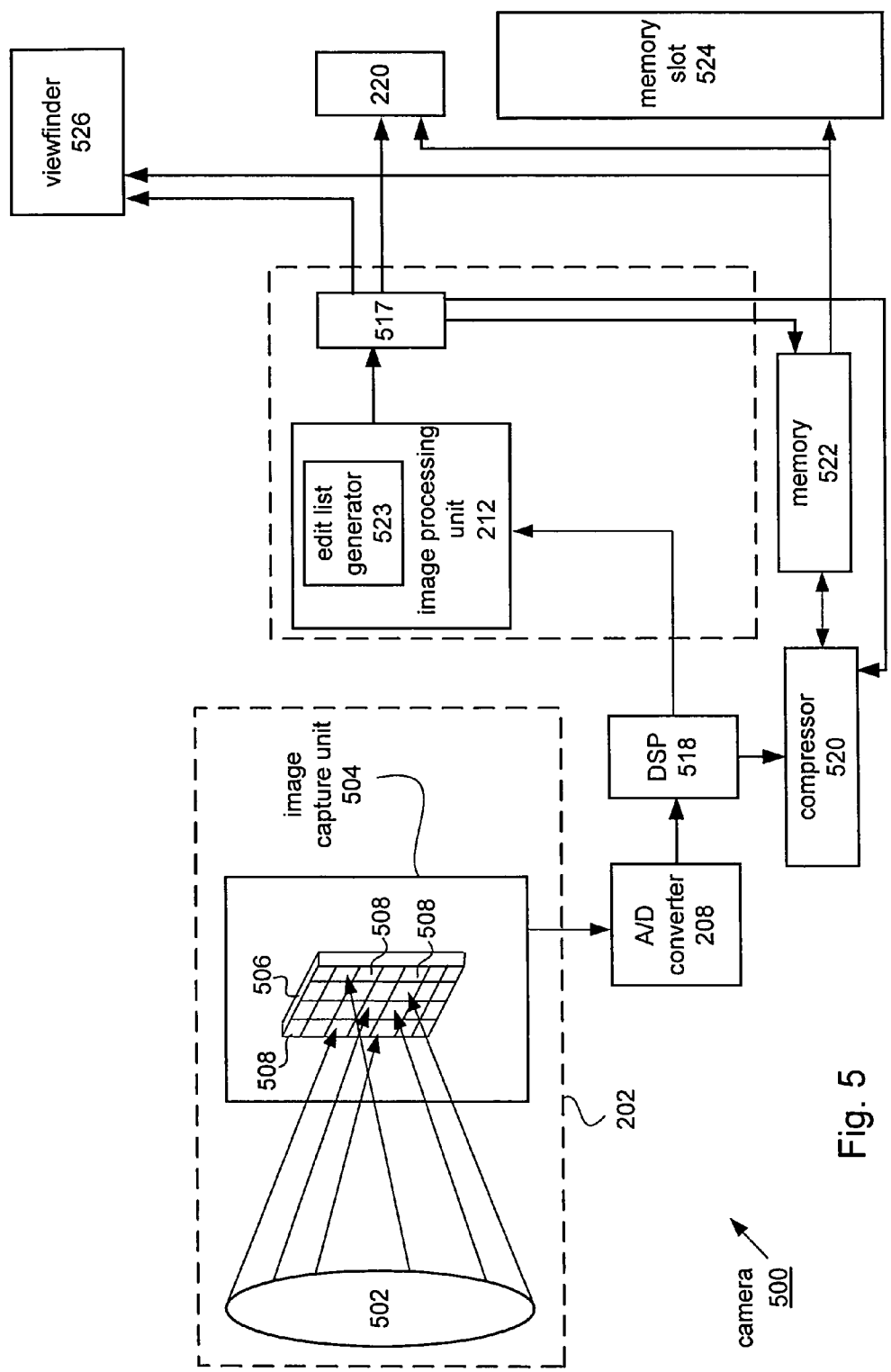
FIG. 5 shows a digital camera system in accordance with an embodiment of the invention.

The invention will now be described in terms of a digital appliance, such as a digital camera system that can take the form of either a still or a video camera system. Referring to FIG. 5, a digital camera system 500 in accordance with an embodiment of the invention is described. In this example, the camera system 500 is capable of color correcting digital images either on the fly or after the fact. In some cases, it may be advantageous to generate an edit list describing the color correction, such as an ICC profile, that is required in conjunction with an uncorrected reference image, thus preserving the original digital negative. Also stored will be a resultant image, most likely of a low-resolution thumbnail image with the color correction applied such that it can be displayed on the LCD of the camera. The uncorrected reference image (digital negative) along with the edit list can then be downloaded to either a local host computing device or can be sent to a remote computing device for further image processing. Alternatively, if transmission of the digital negative is not possible, the resultant proxy image, along with the edit list, can be transmitted and displayed on local host computing device or remote computing device. At a later time, the edit list, which is associated with the resultant proxy image can be processed and applied to the digital negative, which is referenced from the edit list.

Typically the digital camera system 500 includes the image source 202 that includes an optical lens 502 for focusing light rays onto a imaging capture unit 504. The imaging capture unit 504 typically relies upon an array of light sensitive photo optic cells 506 capable of converting the light rays, in the form of photons, received from the optical lens 502 into representative analog signals. Most commonly, the photo optic cells take the form of charge coupled devices (CCDs), although other devices such as CMOS receptors may be used as well.

As is well understood in the art, each CCD array 506 has associated with it a specific color filter array (CFA) 508. In most applications, the CFA 508 is an empirically derived pattern of individual color filters each associated with a specific CCD cell in the CCD array. When the analog signals representative of the captured image are produced by the image capture unit 504, they are sent first to an analog to the digital (A/D) converter unit 208 that converts the representative analog signals into digital signals representative of the image. The digital signals are then passed to a digital signal processor (DSP) 518 where they are converted to an appropriate digital format.

In some embodiments of the invention, an image compression circuit 520 as well as a memory 522 both receive the appropriately formatted digital signals. The image compression circuit 520 operates to digitally compress the received digital images in order to reduce the amount of resources required to further process the digital signals. One such formatting scheme referred to as JPEG is commonly used, although there are a wide variety of suitable picture formats.

In one embodiment, the digital image stored in the memory 522 can be sent by way of a memory interface (not shown) to a memory slot 524 capable of receiving a memory card suitable for storing the processed digital signals. Such memory cards include "floppy" disks, flash EPROM cards, R/W compact disc (CD), SmartMedia, CompactFlash, Sony's MemoryStick, DVD, DAT, and the like. Alternatively, the digital image stored in the memory 522 can be sent to external circuitry, such as a computer, by way of the output port 220 as directed by a selector 517 for viewing or, in some cases, additional image processing. In the situation where a number of images are stored in the memory 522, a user can pre-select any number of images for additional processing by viewing the images (generally in a thumbnail form) using a viewing device such as a viewfinder 526.

In the case where the digital image is to be processed by an external computer, for example, an edit list generator 523 generates an edit list consistent with those color corrections required to compensate for the ambient light conditions. The edit list generator 523 can either embed the edit list in the reference image or it can create a separate edit list which is associated with the reference digital image, by for example, a pointer.

If it is determined that the digital image is not to be processed by the image processing unit 212, then the image stored in the memory 522 can be sent to either the display unit 526, to a device coupled to the memory slot 524, or to external circuitry, such as a computer, by way of the output port 220. In this case, the external computer can actually perform the color correction as indicated by the edit list generated by the edit list generator 523.

Figure 6:
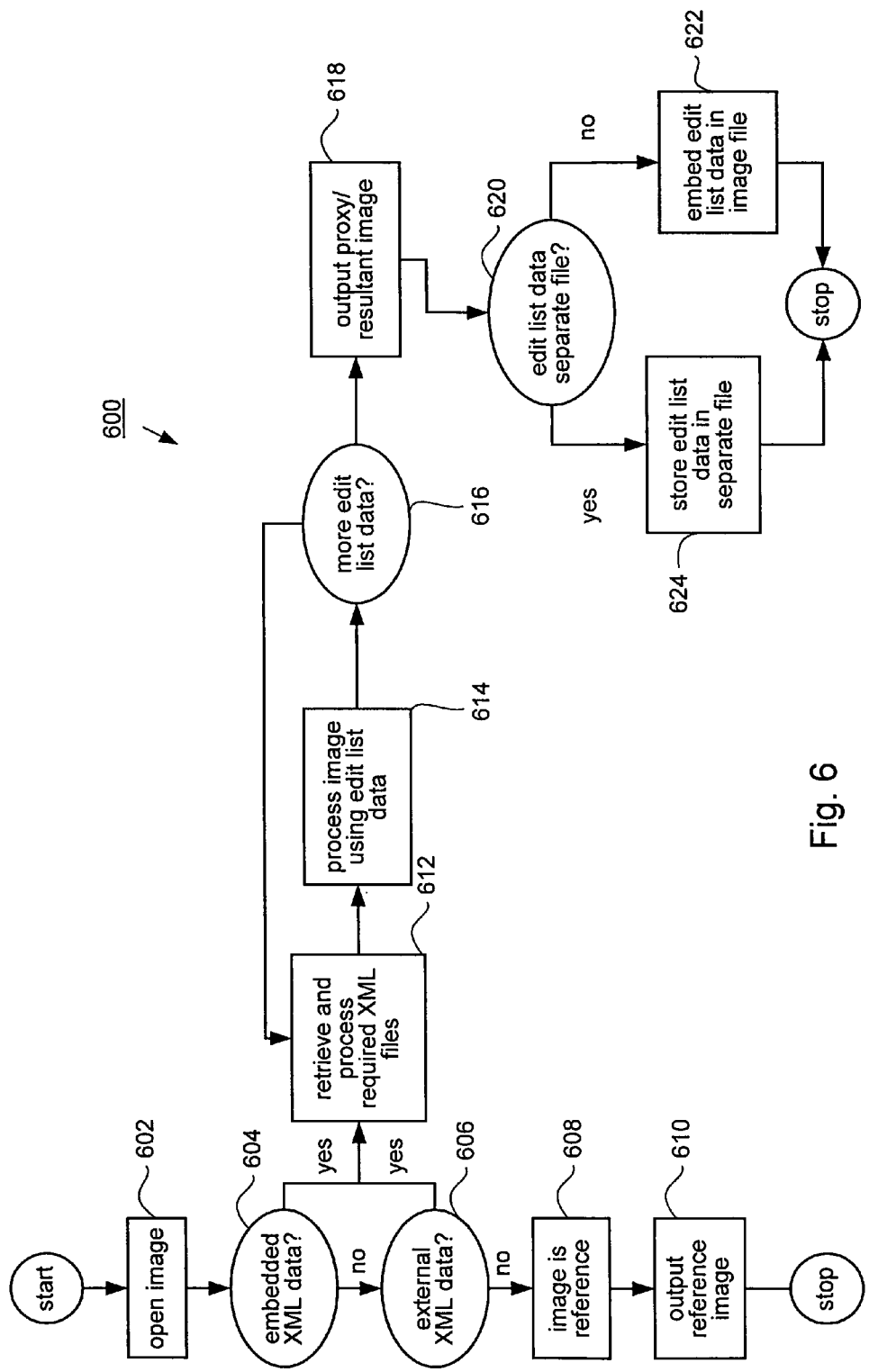
FIG. 6 shows a flowchart is shown detailing a process carried out by the digital image processing engine shown in FIG. 2.

Referring now to FIG. 6, a flowchart is shown detailing a process 600 processing a digital image by the digital image processing engine in accordance with an embodiment of the invention. The process 600 begins at 602 when a particular digital image is opened by the image processing engine. At 604 and 606, a determination is made if there is edit list data embedded in or if external edit list data is referenced to, respectively, the opened image file. If it is determined that there is no embedded or reference edit list data, then the digital image is determined to be a reference image (i.e., a digital negative) at 608 and is sent to the output unit at 610. On the other hand, if it was determined that there was either embedded or referenced edit list data associated with the input digital image, then the edit list data files are retrieved at 612. The retrieved edit list data files, which includes information about how to retrieve the original digital negative, are then used at 614 to process the digital negative after which at 616 a determination is made whether or not there are additional edit list data files to be retrieved. If more edit list files are to be retrieved, then control is passed back to 612, otherwise the resulting proxy image is generated and sent to the output unit at 618. At 620, a determination is made whether or not the edit list data associated with the resultant proxy image is to be embedded or external. If the edit list data is determined to be embedded, then the edit list data is embedded in the resultant proxy image at 622, otherwise the edit list data is stored in an associated edit list file, such as, for example, an edit list at 624.

Figure 7:
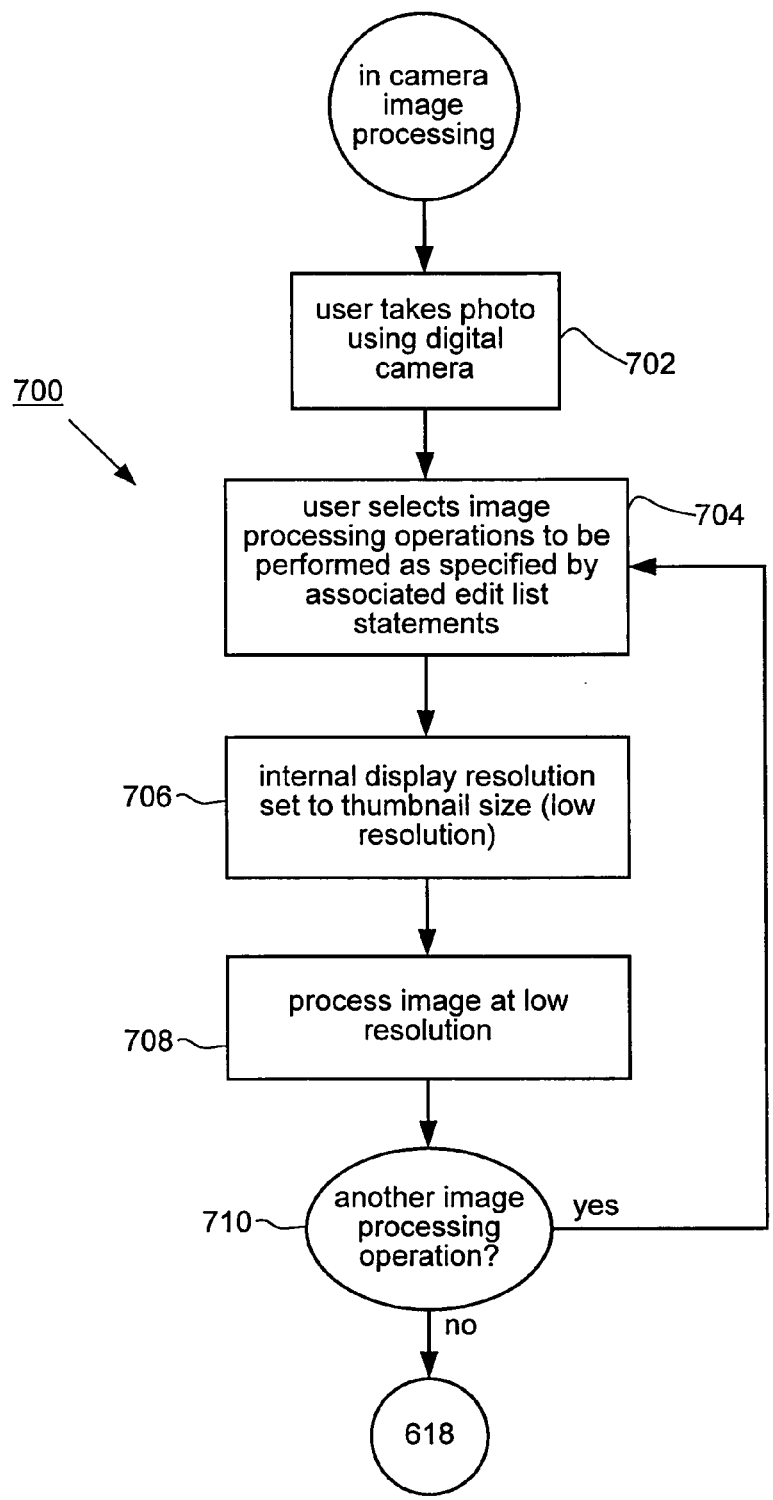
FIG. 7 shows a flowchart detailing a process for performing in camera image processing in accordance with an embodiment of the invention.

In a particular scenario, a user can perform in camera digital processing operations as detailed by flowchart of a process 700 as illustrated in FIG. 7 in accordance with an embodiment of the invention. The process 700 can be carried out in any suitably arranged digital appliance, such as for example, the digital camera 500 described above with reference to FIG. 5. Therefore, using the camera 500 in the present example, a digital camera user takes a digital photo at 702. As described above, the digital photo is stored locally in an in camera memory or a memory cart type device coupled thereto. Once the photo has been taken, the user selects an image processing operation to be performed by the image processing engine as instructed by edit list statements corresponding to the desired image processing operations at 704. It should be noted that the user can, in one embodiment, select an entire suite of operations each of which are converted to a corresponding edit list statement that taken together form an edit list which is then stored and made available for subsequent processing of the digital image.

On the other hand, the user can select a single operation to be performed one at a time. In any case, the internal display resolution can be set to low resolution, often referred to as a thumbnail image at 706. By setting the internal resolution to low, image processing resources required to be supplied by the camera are substantially reduced over what would otherwise be required by processing a corresponding high resolution version of the image. Therefore, at 708 the low resolution version of the image is processed according to the edit list statement(s) to form a resultant proxy image. Once the processing is complete, then a determination is made whether or not there are additional processing operation at 710. If there are additional processing operations, then control is passed back to 704 (or additional processing operations are retrieved from the stored edit list). Otherwise, the resultant proxy image with the associated edit list is output by passing control back to (618) of the process 600 shown in FIG. 6.

Figure 8:
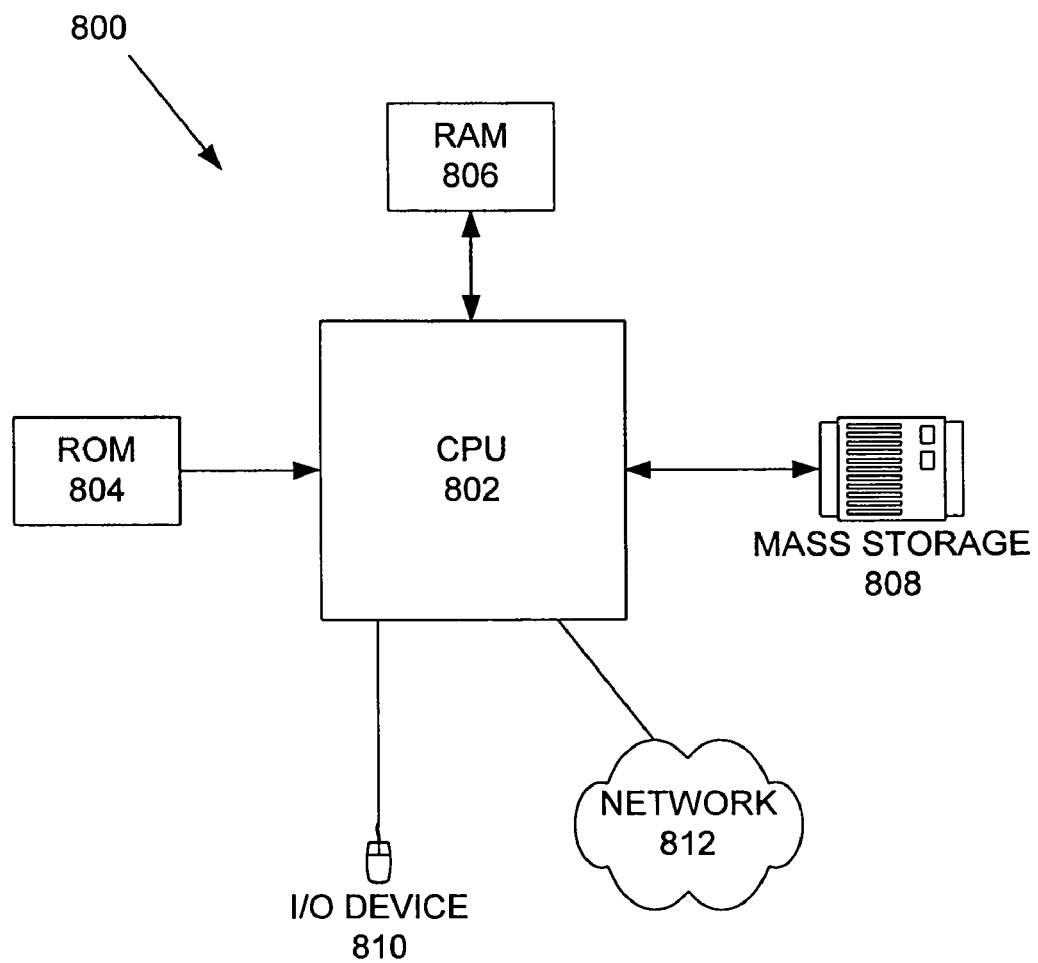
FIG. 8 illustrates a computer system employed to implement the invention.

FIG. 8 illustrates a computer system 800 or any imaging-enabled computing appliance/device that employed to implement the invention. The computer system 800 or, more specifically, CPUs 802, may be arranged to support a virtual machine, as will be appreciated by those skilled in the art. As is well known in the art, ROM acts to transfer data and instructions uni-directionally to the CPUs 802, while RAM is used typically to transfer data and instructions in a bi-directional manner. CPUs 802 may generally include any number of processors. Both primary storage devices 804, 806 may include any suitable computer-readable media. A secondary storage medium 808, which is typically a mass memory device, is also coupled bi-directionally to CPUs 802 and provides additional data storage capacity. The mass memory device 808 is a computer-readable medium that may be used to store programs including computer code, data, and the like. Typically, mass memory device 808 is a storage medium such as a hard disk or a tape which generally slower than primary storage devices 804, 806. Mass memory storage device 808 may take the form of a magnetic or paper tape reader or some other well-known device. It will be appreciated that the information retained within the mass memory device 808, may, in appropriate cases, be incorporated in standard fashion as part of RAM 806 as virtual memory. A specific primary storage device 804 such as a CD-ROM may also pass data uni-directionally to the CPUs 802.

CPUs 802 are also coupled to one or more input/output devices 810 that may include, but are not limited to, devices such as video monitors, track balls, mice, scanners, PC-card readers, digital cameras, digital video, remote control units for TVs, VCRs, DVD players, and the like, keyboards, microphones, touch-sensitive displays, transducer card readers, magnetic or paper tape readers, tablets, styluses, voice or handwriting recognizers, or other well-known input devices such as, of course, other computers. Finally, CPUs 802 optionally may be coupled to a computer or telecommunications network, e.g., an Internet network or an Intranet network, using a network connection as shown generally at 812. With such a network connection, it is contemplated that the CPUs 802 might receive information from the network, or might output information to the network in the course of performing the above-described method steps. Such information, which is often represented as a sequence of instructions to be executed using CPUs 802, may be received from and outputted to the network, for example, in the form of a computer data signal embodied in a carrier wave. The above-described devices and materials will be familiar to those of skill in the computer hardware and software arts.

While the present invention has been described as being used with a digital image or video system, it should be appreciated that the present invention may generally be implemented on any suitable digital image system. By way of example, the invention can be used for Web commerce in that users are able to download for free low-resolution (or thumbnail) images or those with watermarks from a content provider (i.e. PhotoDisk, Corbis, Getty, etc). These low-resolution images are used, but with the expectation that higher-quality images and output can be achieved if purchased. The low-resolution image contains an embedded or external reference (and knowledge) to where a high-resolution image can be purchased. It may be that the high-resolution image is also embedded within the low-resolution image, but is simply inaccessible (via encryption) until the user purchases the rights.

This invention also provides for an efficient means of describing a print job. Typically, an application (or print driver) will rasterize an image (or composition of images) to a specific printer resolution, which is output to the printer. While this approach may be acceptable for local, client-side printing, it is clearly inefficient for server-side printing, in particular when the digital negative(s) or the other multimedia assets (such as cards, albums, or other templates) reside remotely (such as the Web). An alternative involves creating a low-resolution resultant image, along with the edits and image composition operations on the local computing device (client), and sending the resultant image (along with the edit list) to the server for processing. The low-resolution (and possibly very small) resultant image contains the edit-list and a URL to the digital negative(s) and other media assets used in the creation of the resultant image (such as text, print layout and templates, and other images) that may reside on the Web. These operations can then be reapplied to the digital negative(s) and other multimedia assets to produce the desired print resolution on the server. This approach clearly preserves bandwidth compared to sending fully-rasterized images to the print service.

Even if some of the original digital negative(s) or the multimedia assets resides on the client system and must be transmitted to the server for processing, this invention still provides significant benefits not yet realized by any product available today. For example, when the user prints "package print", through a remote print service, this invention will clearly reduce the amount of bandwidth required. Package prints are those in which one photo is printed on a variety of different print layout templates (i.e. one 5×7 and two 3×4). Typically on the client side, the application (or print driver) will rasterize an image multiple time, possibly at different resolutions (sizes) onto a given print page, that is sent to a printer (either local or remote). If the page contains printable area of 8"×10" at 600 dpi in RGB color space, this involves transmission of 21 MB (mega-bytes) of data. An alternative approach is to send only the original digital negative(s) and a page description (via a template described in the edit list) on how the photo is to be arranged on the page. This allows the original image to be transmitted, with the final rasterization to the desired printer resolution on the server side. In some cases, the high-resolution digital negative may reside on the Web and thus the client system will not even need to transmit that file, only the small resultant image (which contains the page description and any associated edit list). In the terminology of this invention, the "resultant image" is just a container that references digital negative(s). The edit list describes the page description and the link to the digital negative(s) is to be positioned on the page It should be noted, it is also possible to allow one photo to be replicated many times on the printed page, but with different edit-lists applied to each replicated photo. In this case, only one copy of the digital negative is referenced and uploaded to the remote print service, along with an edit list for each of the replicated photo. The remote printer server can then process the photo with each edit list.

This invention also provides for an efficient mechanism for representing cards, projects and digital albums. The resultant image can hold a low-resolution proxy resultant image that contains the rasterized version of the compositions (card or album with photos) with all imaging operations applied to the original digital negatives. In this case, the digital negatives for the composition may include multiple photos, vector artwork (for the album or card), text strings, sounds, and other multi-media content. A high-resolution rasterized version of the composition can be recreated by reapplying the edit list to the digital negatives and any other multimedia assets (such as the album or card templates) associated with the low-resolution proxy resultant image. Clearly, this has the advantage by allowing a small compact representation of the composition in a single file (such as a JPEG file), but retains the ability to regenerate the composition at a higher resolution as needed. One of the advantages of this approach is that only a limited amount of bandwidth is required to initially download a low-resolution proxy resultant image. If a higher resolution composition is requested, it can be regenerated based on the edit list and the digital negatives and other multimedia assets associated with the lower-resolution resultant image.

Using this technique to represent the card, project, or digital album, a low-resolution resultant image can be generated that holds the composited output of the card, project, or album. This resultant image can be stored on a server and referenced via a URL. This URL can also be sent through e-mail (or other distribution method) to facilitate sharing of photos and derivative works. Although this is a small low-resolution image is stored on the server, a high-resolution image can be quickly generated if needed (such as for zooming into the detail, printing, or when access to higher resolution data is needed).

Alternatively, this resultant image does not need to be stored on the server, but can be sent through e-mail (or other distribution method) to facilitate sharing of photos and derivative works. This e-mail (on the recipient's local computing device) contains the resultant image with contains the edit list associated links to the digital negative(s) and all the other assets required to recreate a high-resolution representation of the resultant proxy image composition sent via e-mail. Obviously, a combination of these two approaches may also be used (send the resultant proxy image with a link to the same resultant proxy image that also resides on the server accessible via a URL.)

When printing a greeting card or album via a remote print service and the multimedia assets includes a vector-based template (such as PostScript, EPS, Adobe Illustration, SVG (Structured Vector Graphics)), an even larger savings is achieved using this invention. This is regardless if the vector-based template resides remotely (such as at the print server) or locally (and must be transmitted to the printer server). Normally, vector-based template is much more compact than raster-based image data. Further, rasterization of vector-based template for a 300 dpi 8×10" image will result in a 20+MB file. However, this rasterization occurs at the print server, and thus only a small vector-based template must be transferred to the printer server (if it does not already have a copy of this template).

In other embodiments, a watermark can be embedded in the digital image that includes the edit list but also a link to a first digital negative (i.e., the digital negative from which the resultant digital image is directly derived). In other embodiments, the watermark can include pointers to the edit list any digital negative of whatever generation.

It should be noted that the digital negative itself could be a standard image file type (JPEG, TIFF, PNG, etc.) or a propriety image format. Alternatively, the digital negative could be a recursive resultant image that points to multiple digital negative(s) and its associated edit list. This provides a powerful mechanism in which a low-resolution proxy image could be subsequently edited and/or placed inside a print job, package print, card, or digital album. Then an application, or server application, that supports this invention will be able to reapply all the editing operations recursively to generate the highest quality output image as required by the output device. For those applications that do not support this invention, they will be able to print the top most resultant image that is the composition of all recursively added inner images.

The resultant proxy image may also be a standard image file type (JPEG, TIFF, PNG, etc.) or a proprietary image format, with a resolution specified by the application that creates the resultant proxy image. It is also possible in some cases that a resultant proxy image does not even exist (or is "empty" with out a physical pixel representation). As described above, the edit list of operations may describe a print layout template with the associated digital negatives (and possible edit list of editing operations) and other multimedia assets. In this case, the creation of the resultant image is not needed since the printer service will process the edit list and its associated digital negatives and other assets and generate the desired output. As a convenience, this could be represented as a blank JPEG file with an embedded or externally linked edit list.

It should be also noted that the edit list could be persisted through many different mechanisms. The preferred embodiment uses XML (extensible Markup Language), but other formats, both standard and proprietary could be used to implement this invention. Further, this edit list can either be included with the resultant image or linked to it via a separate file.

The distributed nature as described in the recursive example above also provides a powerful and flexible workflow such that separate designers can work on different parts of this recursive structure without effects to the others.

Therefore, the present examples are to be considered as illustrative and not restrictive, and the invention is not to be limited to the details given herein, but may be modified within the scope of the appended claims along with their full scope of equivalents.

What is claimed is:

1. In a distributed network, a method for automatically synchronizing each of a set of distributed multimedia assets, comprising:
   (a) modifying a particular one of the set of distributed multimedia assets; and
   (b) automatically synchronizing all others of the set of distributed multimedia assets based upon (a).

2. A method as recited in claim 1, further comprising:
   (c) generating an update edit list corresponding to (a).

3. A method as recited in claim 2, wherein the automatically synchronizing comprises:
   (d) forwarding the update edit list to the others of the set of distributed multimedia assets; and
   (e) modifying each of the others of the set of distributed multimedia assets based upon the forwarded update edit list.

4. A method as recited in claim 1, further comprising:
(f) generating a resultant multimedia asset corresponding to (a), wherein the resultant multimedia asset is formed of a digital negative of the particular one of the set of multimedia assets and a corresponding edit list, wherein the edit list represents all modifications made to the digital negative.

5. A method as recited in claim 4, wherein the automatically synchronizing comprises:
(g) replacing each of the others of the set of distributed multimedia assets with the resultant multimedia asset.

6. A method as recited in claim 1, wherein the multimedia asset is a digital image.

7. A method as recited in claim 6, wherein the digital image is one of a plurality of associated digital images.

8. A method as recited in claim 7, wherein the plurality of associated digital images take the form of an album.

9. A method as recited in claim 1, wherein the edit list is one of a number of edit lists included in a catalog file.

10. A method as recited in claim 9, where each of the number of edit lists included in the catalog file are associated with a particular multimedia asset.

11. In a distributed network, an apparatus for automatically synchronizing each of a set of distributed multimedia assets, comprising:
a first means for modifying a particular one of the set of distributed multimedia assets; and
a second means for automatically synchronizing others of the set of distributed multimedia assets based upon the modifying of the first means.

12. In a distributed network, an apparatus as recited in claim 11, further comprising:
a third means for generating an update edit list based upon the modifying of the first means.

13. In a distributed network, an apparatus as recited in claim 12, wherein the automatically synchronizing comprises:
a fourth means coupled to the third means for forwarding the update edit list to the others of the set of distributed multimedia assets; and
a fifth means coupled to the fourth means for modifying each of the others of the set of distributed multimedia assets based upon the forwarded update edit list.

14. In a distributed network, an apparatus as recited in claim 11, further comprising:
a sixth means coupled to the first means for generating a resultant image corresponding to the modified multimedia asset wherein the resultant image is formed of a digital negative of the particular one of the set of multimedia assets and a corresponding full edit list, wherein the full edit list represents all modifications made to the digital negative.

15. In a distributed network, an apparatus as recited in claim 12, wherein the automatically synchronizing comprises:
a seventh means coupled to the first means for replacing each of the others of the set of distributed multimedia assets with the resultant image.

16. In a distributed network, an apparatus as recited in claim 12, wherein the multimedia asset is a digital image.

17. In a distributed network, an apparatus as recited in claim 16, wherein the digital image is one of a plurality of associated digital images.

18. In a distributed network, an apparatus as recited in claim 17, wherein the plurality of associated digital images take the form of an album.

\* \* \* \* \*